(12) United States Patent
Fisher et al.

(10) Patent No.: US 12,246,978 B2
(45) Date of Patent: Mar. 11, 2025

(54) WATER TREATMENT SYSTEM AND METHOD

(71) Applicant: Hyperion H20 LLC, Dallas, TX (US)

(72) Inventors: Julian Fisher, Dallas, TX (US); Randy A Galgon, Nuremberg, PA (US); Patrick Ryan, Minneapolis, MN (US); Jaren Leet, Walnut Creek, CA (US); Ray Stickney, Port Rowan (CA)

(73) Assignee: Hyperion Water Technologies LLC, Dallas, TX (US)

( * ) Notice: Subject to any disclaimer, the term of this patent is extended or adjusted under 35 U.S.C. 154(b) by 669 days.

(21) Appl. No.: 16/952,840

(22) Filed: Nov. 19, 2020

(65) Prior Publication Data

US 2021/0147272 A1 May 20, 2021

Related U.S. Application Data

(60) Provisional application No. 62/938,267, filed on Nov. 20, 2019.

(51) Int. Cl.
  *C02F 9/00* (2023.01)
  *B01D 53/34* (2006.01)
  (Continued)

(52) U.S. Cl.
  CPC .............. *C02F 9/00* (2013.01); *B01D 53/343* (2013.01); *B01D 53/76* (2013.01); *C02F 1/004* (2013.01);
  (Continued)

(58) Field of Classification Search
  CPC ............ B01D 17/0205; B01D 17/0208; B01D 17/044; B01D 17/08; B01D 19/0005;
  (Continued)

(56) References Cited

U.S. PATENT DOCUMENTS

| | | |
|---|---|---|
| 5,399,267 A | 3/1995 | Wang |
| 7,163,664 B2 | 1/2007 | Paskalov |

(Continued)

OTHER PUBLICATIONS

European Patent Office, Annex to Form PCT/ISA206—Communication Relating to the Results of the Partial International Search Report transmitted Feb. 25, 2021, in PCT Application No. PCT/IB2020/060979.

*Primary Examiner* — Chester T Barry
(74) *Attorney, Agent, or Firm* — Sean O'Connell, PLLC

(57) ABSTRACT

A water treatment system and method. Influent water produced from an oil and gas production or the like is circulated in a multistage unit where the water is treated by degassing the water by saturating the water with air, stripping volatile compounds from the water, evaporating non-aqueous phase liquid petroleum from the water, repeatedly stripping and equilibrating inorganic carbons in the water, subliming semi-solids from the water, and breaking colloids in the water using continuous cavitation. Water from the multistage unit is clarified through floatation and sedimentation and biological material in the water is inactivated using irradiation. Water is then filtered before being provided as treated water for an application specific process such as electro desalination reversal, fracking reuse, or other wastewater recovery.

17 Claims, 8 Drawing Sheets

(51) Int. Cl.
  *B01D 53/76* (2006.01)
  *C02F 1/00* (2023.01)
  *C02F 1/04* (2023.01)
  *C02F 1/20* (2023.01)
  *C02F 1/24* (2023.01)
  *C02F 1/32* (2023.01)
  *C02F 1/34* (2023.01)
  *C02F 1/40* (2023.01)
  *C02F 1/78* (2023.01)
  *C02F 101/32* (2006.01)
  *C02F 103/10* (2006.01)
  *C02F 103/36* (2006.01)

(52) U.S. Cl.
  CPC ........ *C02F 2001/007* (2013.01); *C02F 1/048* (2013.01); *C02F 1/20* (2013.01); *C02F 1/24* (2013.01); *C02F 1/325* (2013.01); *C02F 1/34* (2013.01); *C02F 1/40* (2013.01); *C02F 1/78* (2013.01); *C02F 2101/32* (2013.01); *C02F 2103/10* (2013.01); *C02F 2103/365* (2013.01); *C02F 2301/046* (2013.01); *C02F 2303/04* (2013.01)

(58) Field of Classification Search
  CPC ........ B01D 53/343; B01D 53/76; B01D 7/00; C02F 1/001; C02F 1/004; C02F 1/048; C02F 1/20; C02F 1/24; C02F 1/30; C02F 1/325; C02F 1/34; C02F 1/40; C02F 1/78; C02F 2001/007; C02F 2101/32; C02F 2101/322; C02F 2103/10; C02F 2103/365; C02F 2301/046; C02F 2303/04; C02F 9/00
  See application file for complete search history.

(56) References Cited

U.S. PATENT DOCUMENTS

| | | | |
|---|---|---|---|
| 7,396,453 | B1 | 7/2008 | Probst |
| 7,648,634 | B2 | 1/2010 | Probst |
| 8,097,163 | B1 | 1/2012 | Stewart |
| 8,821,728 | B2 | 9/2014 | Galgon |
| 8,992,776 | B2 | 3/2015 | Galgon |
| 9,708,870 | B2 | 7/2017 | Posa |
| 9,908,800 | B2 | 3/2018 | Weiss |
| 10,005,686 | B2 | 6/2018 | Powell |
| 10,167,216 | B2 | 1/2019 | Graves |
| 10,266,424 | B2 | 4/2019 | Kubala |
| 2007/0102359 | A1* | 5/2007 | Lombardi ............... B01D 61/04 210/764 |
| 2008/0277354 | A1* | 11/2008 | Baerheim ............... B63J 4/002 210/764 |
| 2013/0213893 | A1* | 8/2013 | Posa ............... C02F 1/20 210/708 |
| 2014/0326677 | A1* | 11/2014 | Kinasewich ....... B01D 17/0205 210/705 |
| 2016/0045841 | A1* | 2/2016 | Kaplan ............... C01B 32/05 429/49 |

* cited by examiner

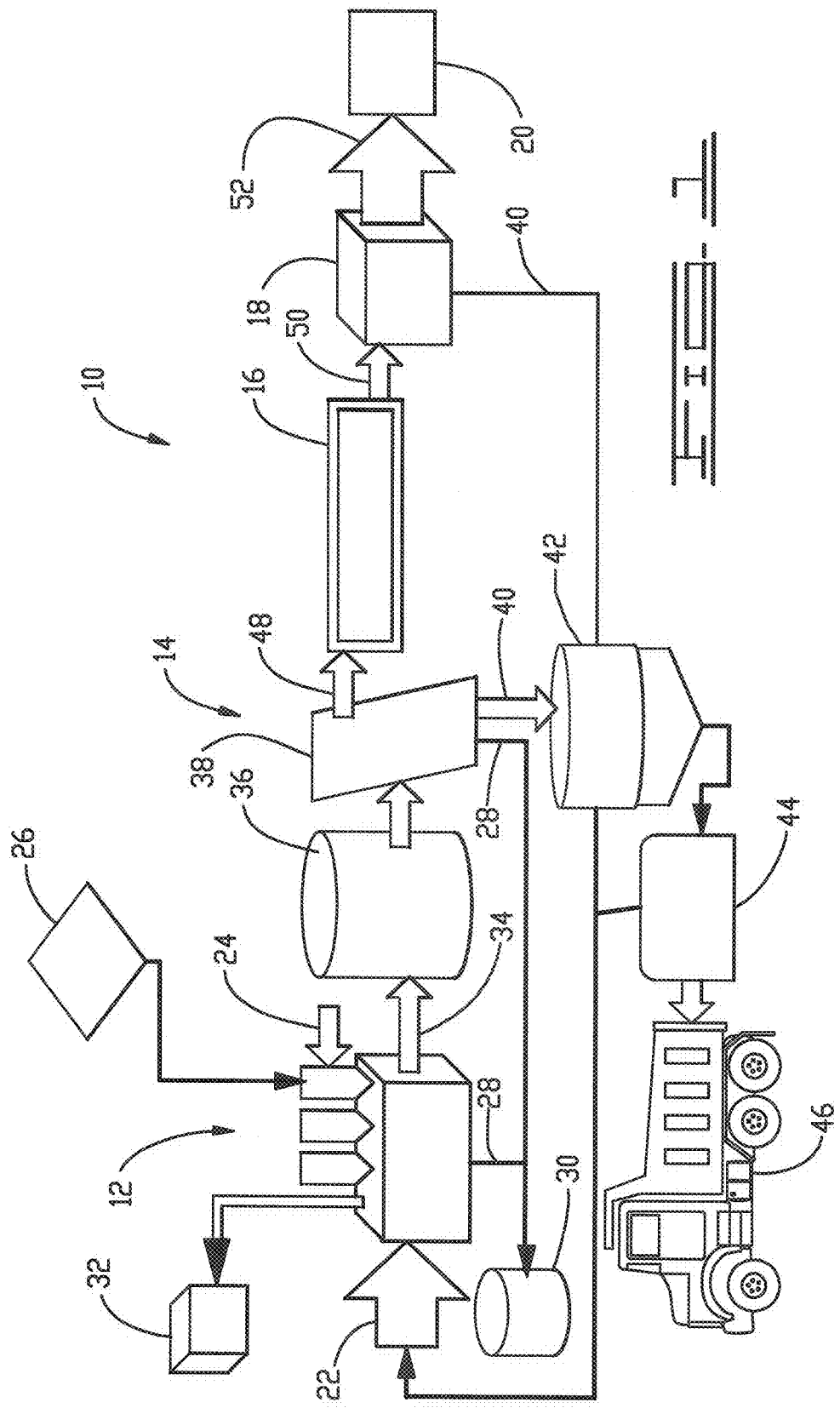

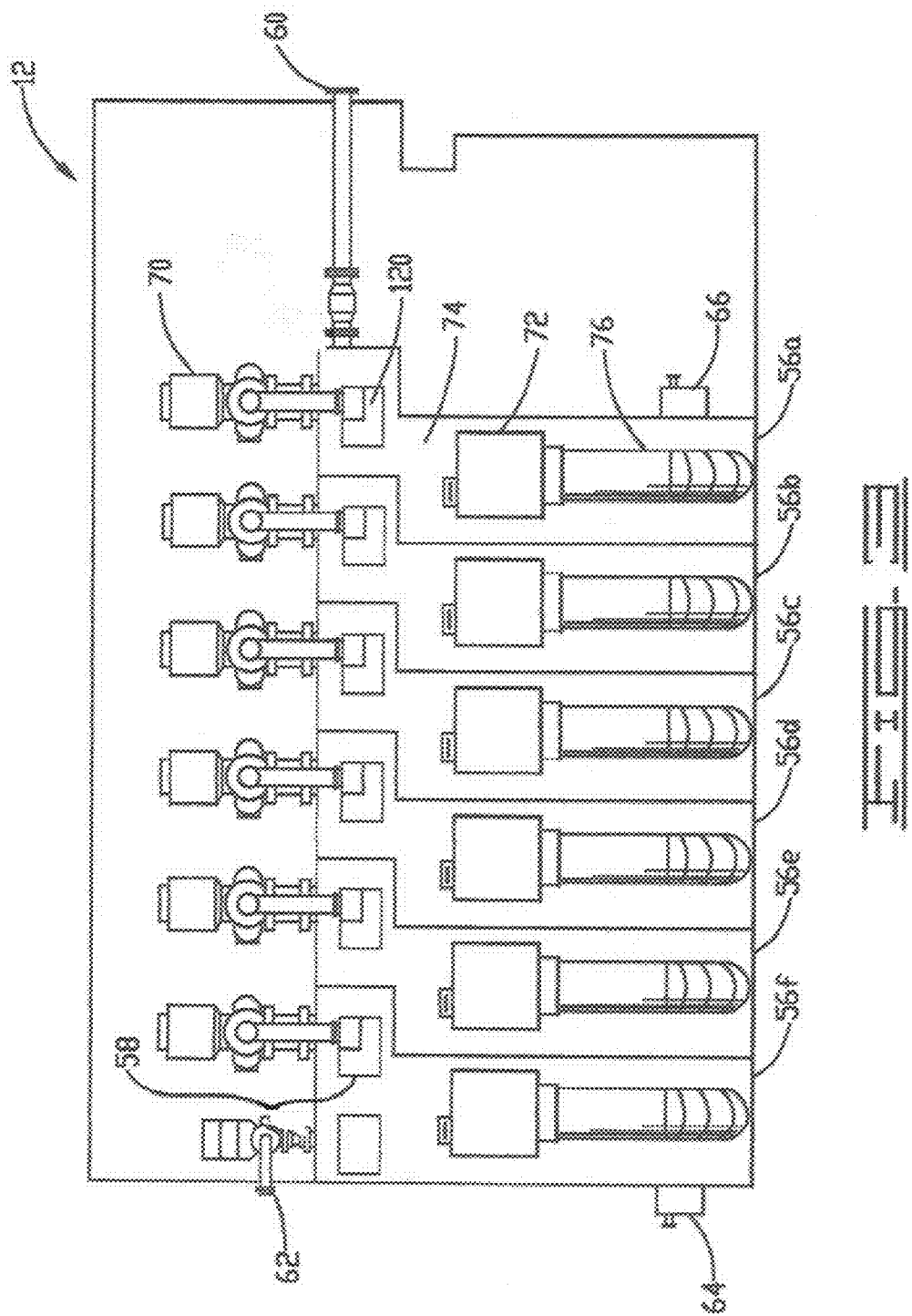

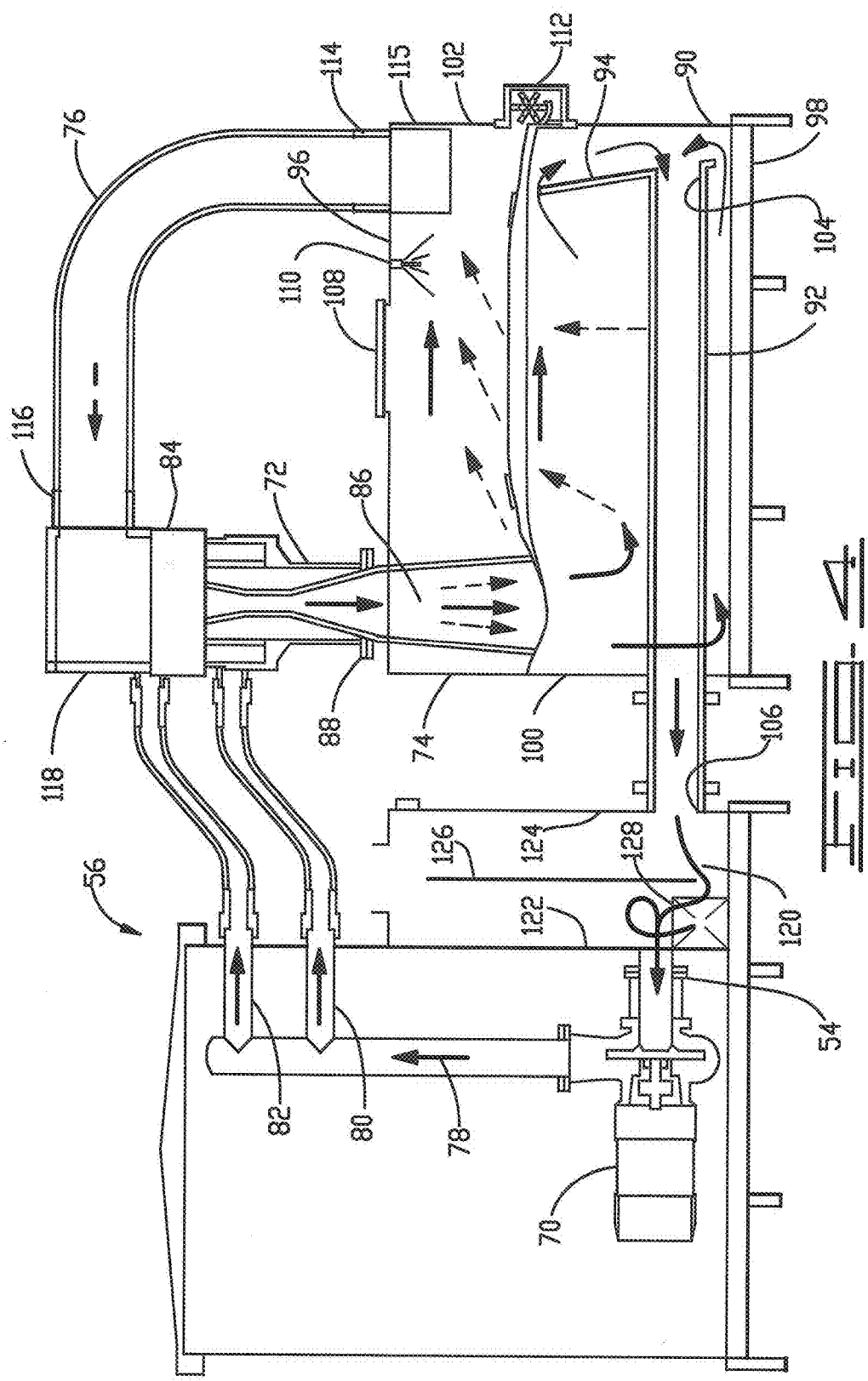

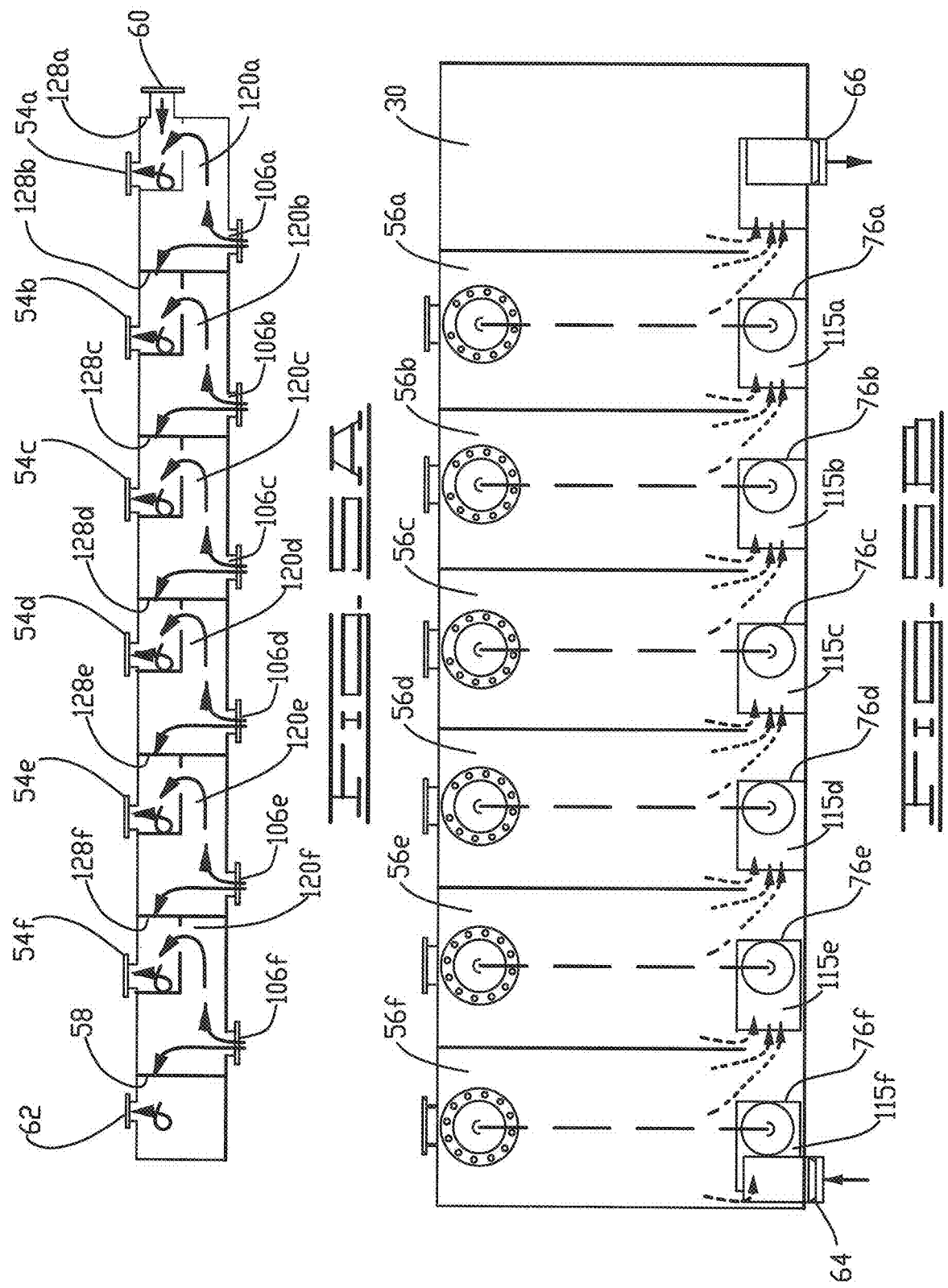

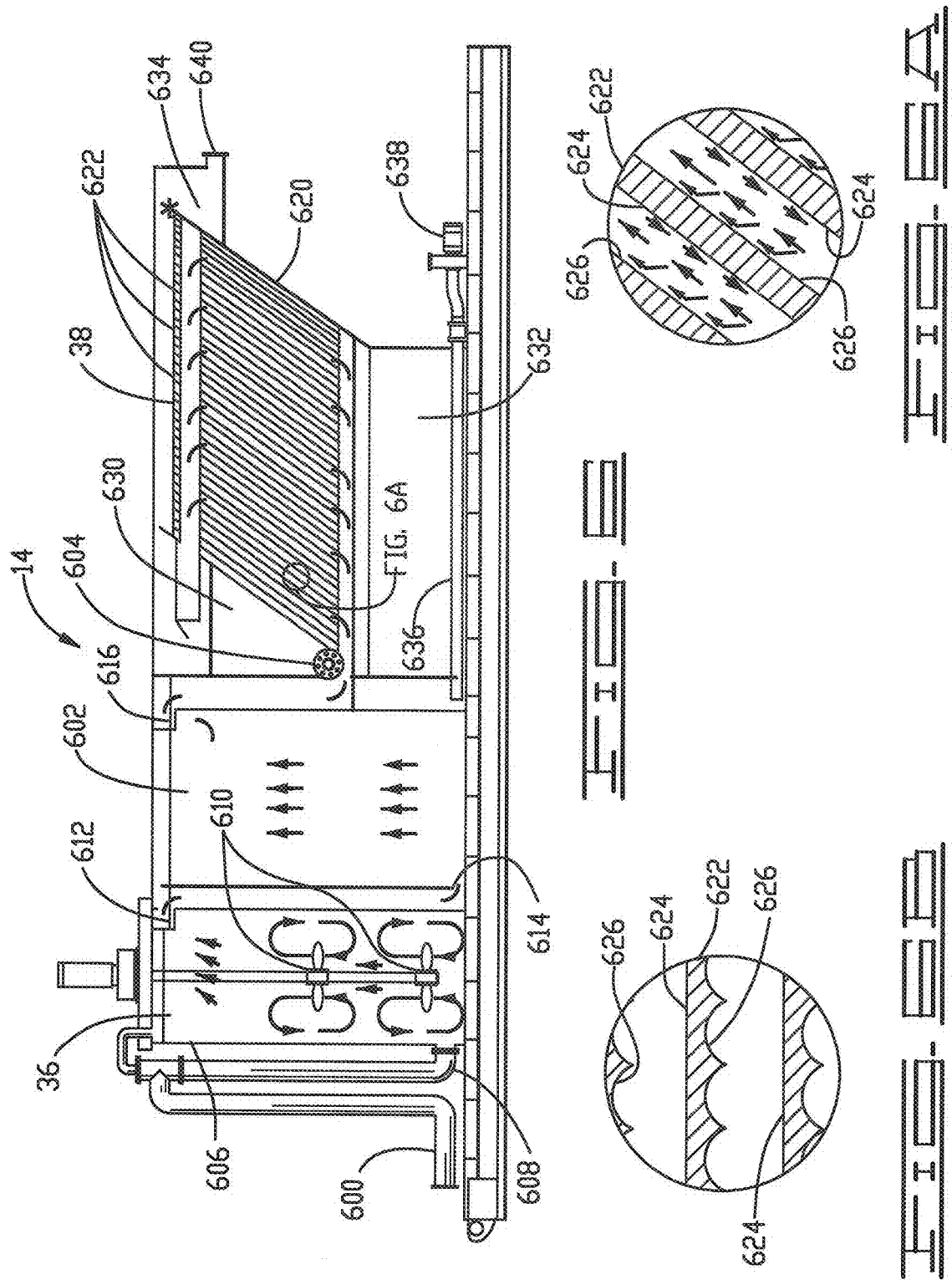

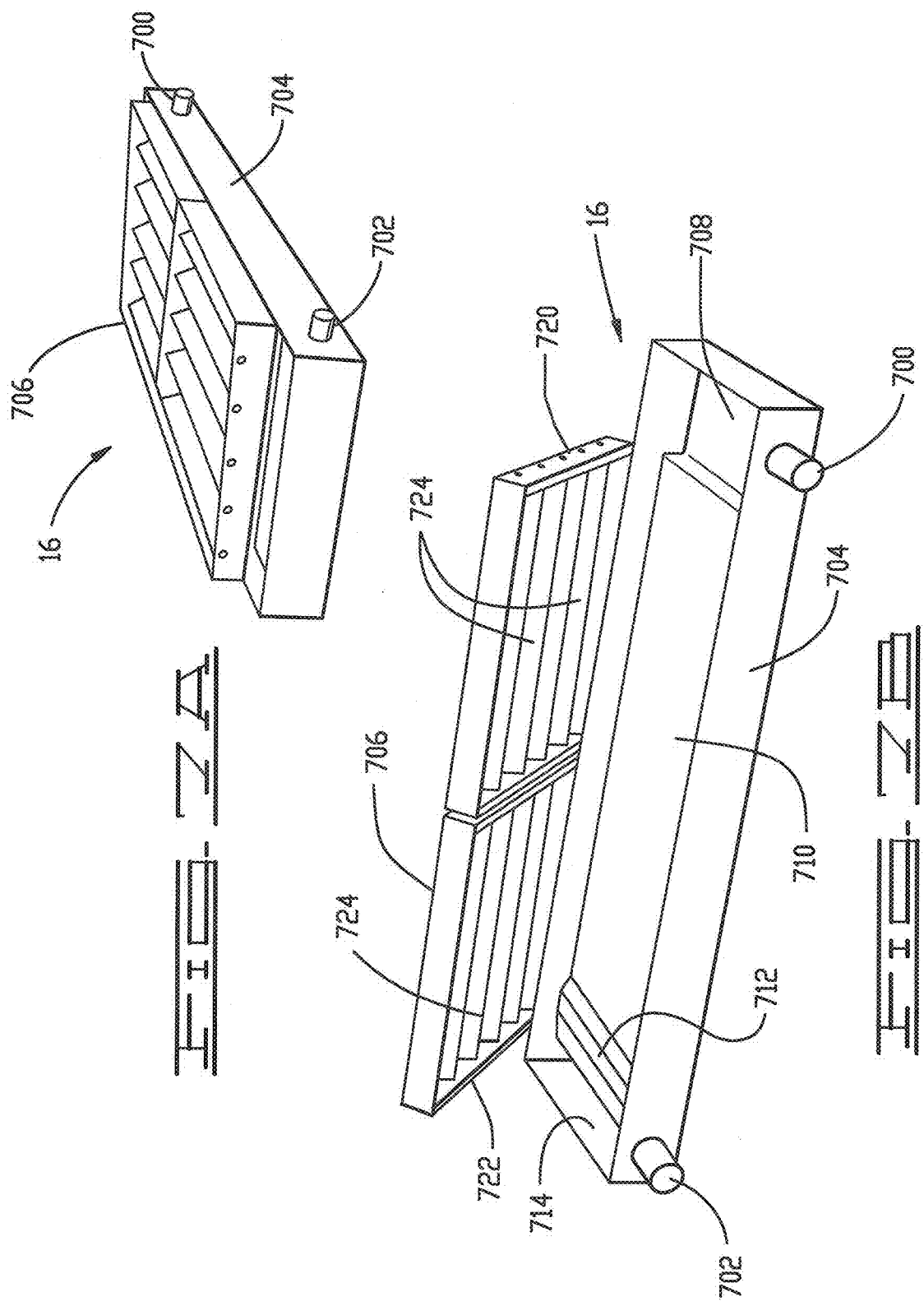

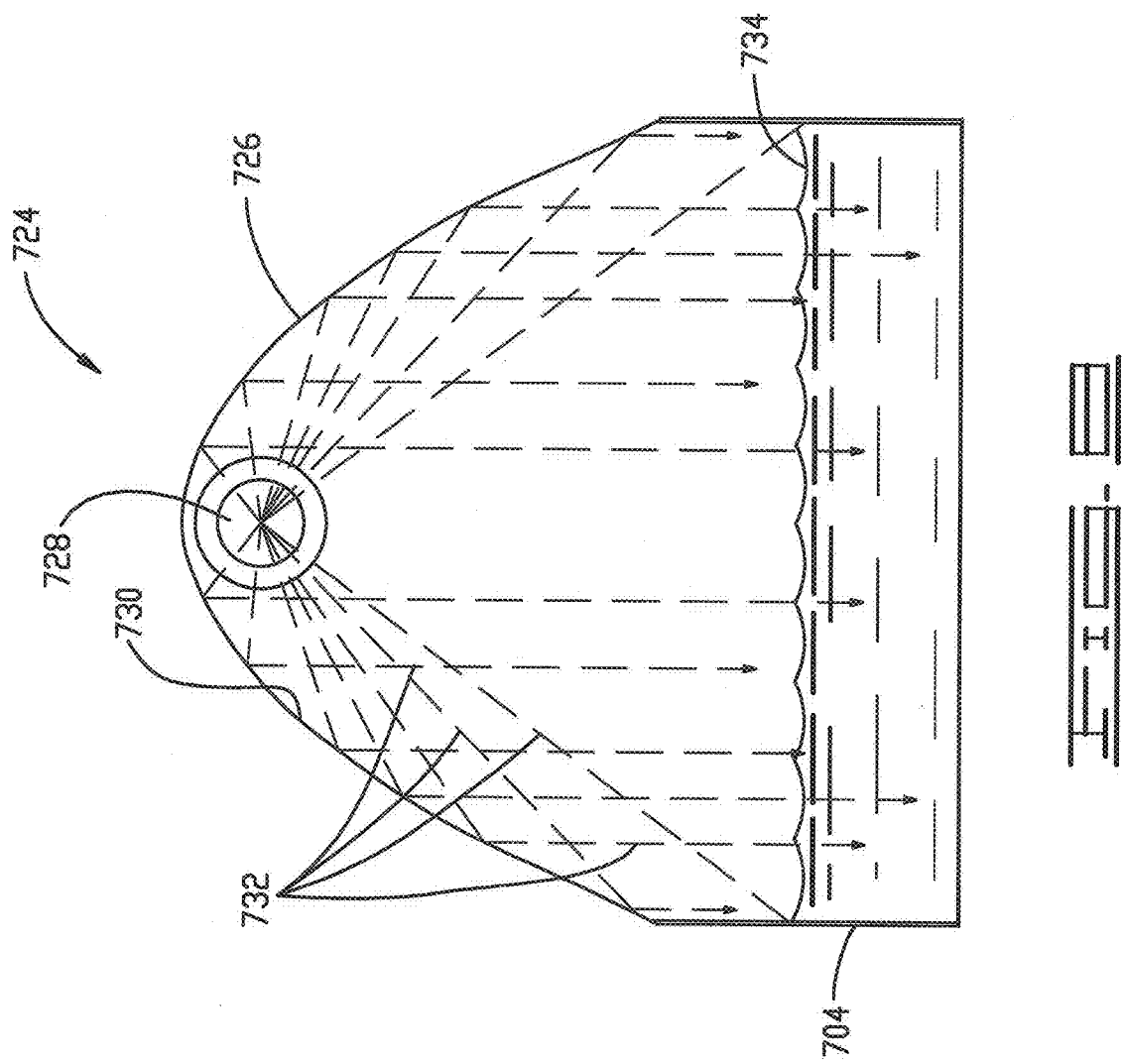

WATER TREATMENT SYSTEM AND METHOD

CROSS REFERENCE TO RELATED APPLICATIONS

This application claims the benefit of U.S. Provisional Application No. 62/938,267, filed Nov. 20, 2019, which is incorporated by reference herein in its entirety.

FIELD OF THE INVENTION

The disclosed system relates to systems for treatment of water and more particularly to treatment of water produced as a result of oil and gas extraction containing petroleum compounds, volatile biomass, formation geochemistry, formation solids and well field management chemicals.

SUMMARY OF THE INVENTION

Embodiments of the present invention provide systems of treating contaminated or dirty waters, such as oil and gas well produced waters containing petroleum compounds, volatile biomass, formation solids and well field management chemicals. The system comprises four units or major components arranged in a series configuration: 1) a conditioning and liquid-gas phase separation and destruction subsystem, 2) a petroleum solids conditioning and non-aqueous phase liquids and solids separation subsystem, 3) a microbial control subsystem, and 4) a filtration subsystem. The system is capable of reducing total petroleum hydrocarbon levels of a produced water from thousands of parts per million (ppm) to levels below 10 ppm. The system is also adapted to reduce other contaminations by means of oxidation, precipitation, stripping and physical separation.

BRIEF DESCRIPTION OF THE DRAWINGS

FIG. 2 is an alternative schematic for the system of FIG. 1.

FIG. 3 is a schematic representation of a desolventing unit of the water treatment system of FIG. 1.

FIG. 4 is an illustration of a single stage of the desolventing unit of FIG. 3.

FIG. 5A is a representation of fluid flow through the desolventing unit.

FIG. 5B is a representation of gas flow through the desolventing unit.

FIG. 6 is a schematic representation of a clarifier unit of the water treatment system of FIG. 1.

FIG. 6A is a detail view of plates from FIG. 6.

FIG. 6B is an increased detail view of the plate shown in FIG. 6A.

FIG. 7A is a schematic representation of an ultraviolet irradiation unit of the water treatment system of FIG. 1.

FIG. 7B is an illustration of the irradiation unit of FIG. 7A shown in an open position.

FIG. 8 is representation of a collimator for use in the irradiator unit of FIG. 7A.

DETAILED DESCRIPTION

Figure 1B:
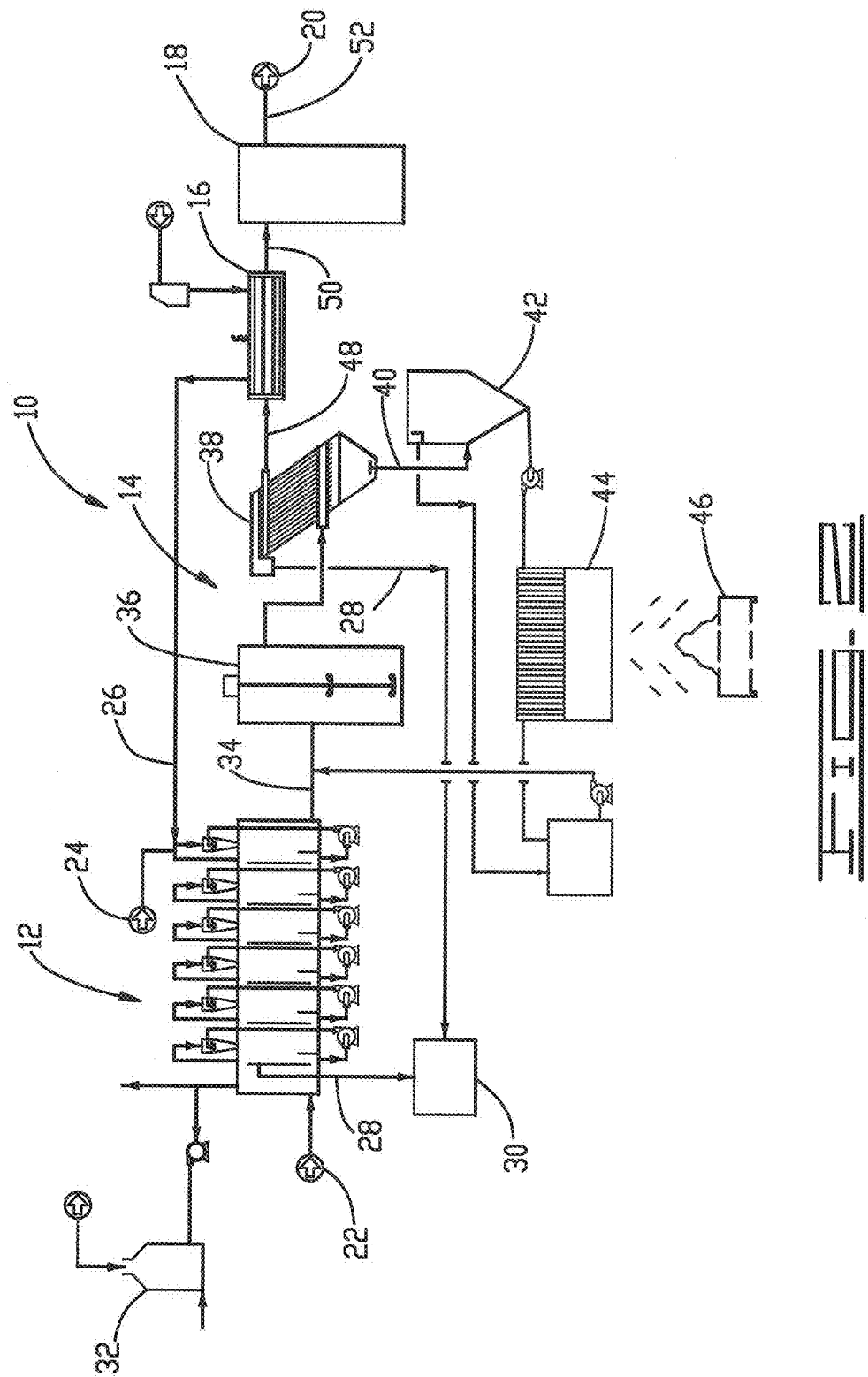
FIG. 1 is a schematic view of a water treatment system in accordance with the present invention.

The operational advantage of this system is treating water unattended continuously depending on water management requirements. Startup, calibration, water testing, operational monitoring, adjustments, and maintenance attention is required. All process controls may be automatic. Process set point values and configuration may be configured for optimal operation. A control system may maintain set points indefinitely, dependent on instrument calibration and equipment performance. Redundant equipment is not required for most operations; trouble is handled by a safe, unattended shutdown of the treatment train. All controls shall fail-safe.

The system includes four subsystems or major components arranged in a series configuration: 1) a conditioning, phase separation and gas destruction subsystem, 2) a petroleum solids conditioning and non-aqueous phase liquids and solids separation subsystem, 3) a microbial control and petroleum solids deposition subsystem, 4) a filtration subsystem. The system is capable of reducing total petroleum hydrocarbon levels of a produced water from thousands of parts per million (ppm) to levels below 10 ppm. The system is also adapted to reduce other contaminations by means of oxidation, precipitation, irradiation, degassing, stripping and physical separation. The treatment system, as designed, is the comprised of five major unit processes. The first through fourth unit processes of the treatment process remove volatile compounds and solids and is referred to as the "Utopia Process". The fifth stage removes dissolved ions, or salts, from the product water while producing a small, concentrated salt waste stream. The system is designed to recover approximately 90% of the influent water.

The first unit process, phase separation is a mass transfer and physical separation partitioning process, uniquely referred to herein as a DeSolventing Unit (DSU). Untreated water flows in to the DSU where the majority of the Total Petroleum Hydrocarbons (TPH) compounds are transferred to the gas phase. This process brings in a control gas, usually fresh air and collected vents from neighboring processes into the liquid downstream end of six DSU stages. The gas flows countercurrent to the water flow through each stage. Pumps recirculate water from the bottom of each stage to the top of each stage. A special draft venturi system allows this recirculating water to induce the gas flow which circulates gas in each stage. The system is designed so that a differential pressure allows for countercurrent gas flow to pass through each DSU stage. The moisture and volatile compounds are vented out of the first flow stage of the DSU. At this point a Regenerative Thermal Oxidizer (RTO) burns the volatile TPH compounds converting them into harmless carbon dioxide and water vapor. Solid TPH compounds are skimmed to a slop tank for truck removal. The mass transfer process will also oxidize dissolved iron by saturating the water stream with air, oxygen and or ozone. This oxidized iron is insoluble and is driven out of solution. The resulting particulate form of iron is removal in the downstream clarification and filtration processes. Partially treated water receives ozone as it exits the DSU.

The second unit process of the process is a petroleum solids deposition and clarification process. This process uses tanks with plates and other structures installed to take the water effluent from the DSU and encourage deposition and ripening of petroleum solids, to settle heavier than water particles to the bottom of the tanks and allow for remaining TPH compounds to float to the water surface. TPH compounds will be skimmed and directed to the slop tank on the DSU skid for truck removal. Solids, which will include deposited petroleum solids and precipitated metal solids like iron, will collect in the bottom of clarifier and be removed by truck. Clarified water, which will only contain a trace amount of fine solids, will continue to the downstream UV and Filter process.

The third unit process is an Ultraviolet Irradiation (UV) and Ozone destruction process, designed to disinfect the water before it flows down into the fourth unit process feed tank. A vent from the UV system removes any off-gassed volatile TPH compounds. The vent gas goes back to the gas intake of the DSU to participate in mass transfer and ultimately to the RTO for TPH compound destruction. Residual ozone is destructed during irradiation.

The fourth unit process and final component of the Utopia process is an UltraFiltration (UF) process, also known as the filter system, designed to remove trace suspended solids from the water. The UF process is composed of flat sheet ceramic membrane modules with sub-micron pores submerged in the clarifier effluent. Pumps draw water through the ceramic modules and deliver it to a downstream filtrate tank. Air is vigorously blown over the membrane modules to minimize the accumulation of solids on the membrane surface. This air is returned to the DSU for destruction of any TPH compounds which may remain in the process. On a regular basis the membranes will back pulse, or reverse flow for a short period, to dislodge solid that may have accumulated in the membrane pores. On a regular basis a Clean In Place (CIP) process will use acid to remove scale from the membranes. Solids will continue to accumulate in the membrane tank. To prevent excessive solids from collecting in the membrane tank the water will be blown down back to the clarifier where the now thickened solids can be removed from the process.

The fifth and final unit process of the system is an ElectroDesalination Reversal (EDR) system designed to reduce the Total Dissolved Solids (TDS) of the water. This system uses charged plates to draw charged salt ions to one end creating a high saltwater stream called the concentrate and allow reduced dissolved solids water, called product, to exit out the other. The system is comprised of four primary EDR stages. Each stage subsequently reduces the amount of TDS in the water. The concentrate from each stage is either returned to a previous stage for further treatment or flows to a Seawater EDR Stage, which is designed to recover even more product water from the concentrate. The product water from the Seawater stage is returned to the head of the EDR while the small concentrate flow from the seawater stage is sent to disposal.

The influent produced water mass balance may reflect historic laboratory data and field measurements to the extent possible. Influent water characteristics will likely reflect certain reliability concerns. Notably, the formation and production system are biologically active. Piping and tanks of the upstream gas collection system may require several shock treatments and cleanings per year. The produced water should be assumed continuously inoculated with archaea, thermophilic bacteria, and local wild microbes along with a permanent methanol load, creating the capacity for explosive bio growth and subsequent pipe, valve, tank, and wet device fouling. Strategic options for handling potential biological issues: 1) contain to smallest area of operations; 2) wherever possible, eliminate pipes, valves or tanks within the active area; 3) limit area of downstream biological activity using high log kill; 4) limit potential contamination area (single barrier) by removing detritus; 5) create hard barrier (UF) to exclude biological activity from EDR; and 6) maintain biocidal environment in filter and EDR by recirculating Electrode Flush. Additionally, produced water contains a significant quantity of short chain paraffins and other petroleum solids. Observations have revealed the paraffins in particular have a freezing point or WAT in the normal operating temperature range of the treatment works. It is clear that paraffins are likely present throughout the system creating reliability issues. Strategies for dealing with paraffin issues include: 1) partition as much as possible to the off-gas; 2) prevent uncontrolled deposition by removing other solvents; and 3) freeze all paraffin to prevent them passing through the ultra-filtration hard barrier to the EDR.

Influent water generally comprises components and characteristics that may impact operability, reliability, or maintainability. The components and characteristics of interest in the influent water include temperature; pH; TDS (principally salt); TSS, i.e. paraffins, oil and grease, scale particles, biomass and associated excretions; TIC, i.e. bicarbonate alkalinity and acid gases; TOC, i.e. dissolved natural gases, inorganic gases, VOCs such as BETX and other gasoline related organics, SVOCs and diesel related organics, organic acid, additives such as methanol, VSS such as active biological components; and metals. The water treatment system may process the influent water to resolve various components present without the benefit of chemical additives. Treatment may be as follows:

Temperature: Temperature of the produced water may be measured as low as 77° F. and as high as 120° F. Polymeric membranes like those in the EDR have a structural temperature limit of 115° F. and optimum processing will occur just below the limit. At design flows and 115° F. the DSU cools the incoming water more than 5° F. making the maximum temperature for design 120° F. before process cooling is required. In general, lower temperatures reduce the e0ectiveness of the stripping, filtration and EDR processes, while higher temperatures increase the effectiveness. Site elevation may affect barometric pressures and consequently temperature. Low atmospheric pressure and elevated water temperatures reduce the available net positive suction head (NPSHa) below standard range. Pumps may be selected for the low NPSHa.

pH: Produced water pH is expected to range between 6.7 to 7.5 pH. No chemical pH adjustment is required. Carbon dioxide degassing within the DSU, EDR operation and to a minor extent, metal hydroxide precipitation will impact the pH.

TSS: Relatively low TSS loading is expected. TSS is expected to pass through the DSU and be captured along with precipitated iron in the oil: water separator and ultra-filtration operation.

Paraffins: Paraffins below C13 have enough vapor pressure that a portion are partitioned to the of-gas for destruction in the RTO. The remaining solidified compounds are largely captured in the residue layer of the DSU and sent to slop. Short chain paraffins not frozen or ripened beyond needle phase are partially collected in the oil: water separator, with the remaining solids removed by ultra-filtration. The DSU is somewhat tolerant of paraffins and is easy to clean. The hotter the processing temperature the less sticky the paraffin. Note: Aluminum and brass within the process stream have shown to attract paraffins and should be avoided. A high output non-contact UV-C system is planned just prior to the ultrafiltration operation. The standard 40 MJ/cm2 anti-microbial dose had no effect on the remaining paraffins during pilot testing. A 200 MJ/cm2 dose is designed to ensure archaea destruction and modify the surface of the solid paraffins, reducing the stickiness and subsequent CIP cleaning requirements of the filter UF.

Oil and grease: Reported oil and grease concentrations are expected to be relatively low. A portion of free oils with vapor pressure will partition to the off gas in the DSU. The bulk will be captured in the residue layer of the DSU. The LRS clarifier (LRS) collects any remaining oil & grease.

Rotary skimmers in both the DSU and LRS send collected material to slop and automate the oil discharge process. In the case of severe oil events, the first stage of the stripping system contains an oil overflow that can be directed to the slop collection tank.

Biosolids: Biosolids are expected to be collected in the LRS. Approximately 5 mg/L is reported as ATP. It should be noted that bio solids are 80% water and occupy 4X the expected volume from TSS value. A rotary skimmer in the also collects floating solids.

TIC/Alkalinity: Total Inorganic Carbon (TIC) is expected to be between 2,500 and 3,500 mg/L (CaCO3) and will distribute among its forms, carbon dioxide, carbonic acid, bicarbonate, and carbonate in ratios dependent on pH. TIC removal will take place in both the DSU operation and EDR. At pH 7 approximately 400 mg/L will be un-ionized as carbon dioxide gas and carbonic acid. The stripping operation within the DSU will remove a portion of the carbon dioxide in each stage, converting carbonic acid and raising the pH. During residence in the degassing sump of the DSU stage, the TIC species will rebalance to a new pH converting bicarbonate to both carbonate and carbon dioxide. The fresh carbon dioxide will again strip in the next stage. If enough equilibration/stripping is used, approximately ⅓ of the TIC will be removed as carbon dioxide and the pH may rise as high as pH 9.5. The EDR also can remove a significant portion of the carbonate and bicarbonate specie. EDR operation lowers the pH and subsequently some of the TIC will be in the form of carbon dioxide.

TOC-TPH: Total Organic Carbon (TOC) is reported as high as 700 mg/L. Considering methanol addition, it is unknown if this is majority TPH. Based on most analysis, TPH is expected to range from 100 mg/L to saturation and free product. VOCs and SVOCs comprised approximately half of the TPH by weight. The majority of the remainder of the TOC is expected to be organic acids and a small amount of additives like methanol and anti-scale. Some components of TOC can have an adverse e0ect on chemical conditioning, produce fouling, or may be regulated in future permits. A complete breakdown analysis of total organic carbon (TOC) is not available for the site.

Methane/VOCs/SVOCs: All volatiles are removed in the DSU operation either through air stripping or evaporation of free product or sublimation of petroleum semi-solids and sent to a regenerative thermal oxidizer for destruction. The majority of VOCs are expected to be BTEX and related compounds, methane, and other natural gases. While no data for methane, butane, etc. was provided, methane is expected to be equilibrated with the 1 psig (107% STD atm pressure) in the head space of the vented Gun Barrel Separator Tank. Methane has very little gas side restrictions and will be removed in the first two stages of the DSU. At the produced water temperatures expected, traditional SVOCs and portions of any compound with vapor pressure will also be partitioned to the off gas.

Inorganic gases: Inorganic gases nitrogen, hydrogen sulfide and carbon dioxide will strip coincidentally with the petroleum compounds. Carbon dioxide is described in the TIC section. Nitrogen is unknown, and likely inconsequential. Hydrogen sulfide is reported at very low levels (<1 mg/L). Starting at pH 7 and rising through the stripping process, about 40% of the H2S is expected to strip with the remainder ionizing at the higher pH. These levels are not expected to impact membrane fouling. If future H2S levels increase, acid neutralization in stage 1 stripper will allow adequate removal.

Organic acid: No provisions are made for removal of the acids, a likely food (electron donor) for the reported bioactivity.

Methanol: No provisions are made for removal of the methanol, also a likely food for the reported bioactivity.

Volatile Suspended Solids: Extensive upstream biological activity is reported. Biomass as TSS is removed in the LRS and ultrafiltration operations. UV irradiation was selected for microbial destruction.

Metals: Metals are a concern as they relate to membrane operation and several may be regulated in the future. Precipitation of metallic hydroxides, sulfates and salts have the potential to foul membranes, increase membrane backwash and chemical cleaning frequency and ultimately reduce membrane life. Foul potential metals, metalloid and salts of concern are: iron, barium, silica, calcium, manganese, sulfur, aluminum, strontium, and boron. Hydrogen sulfide and iron are targeted for removal. With the exception of silica and, to a lesser extent Boron, the bulk of the ionized metals and salts are removed in the EDR.

Iron: Iron is the only dissolved metal precipitated or intentionally removed prior to membrane operations. Some boron and barium will be removed under certain circumstances. Pretreatment includes a DSU to remove VOCs and other oxygen demand compounds to greatest extent possible. The last stage of the DSU also saturates the water with oxygen to convert reduced iron to ferric. The oxidized iron will precipitate as a hydroxide and be removed in LRS and polished in the filter. After the pretreatment dissolved iron <0.3 mg/L. Ozone added to the DSU to prevent colloid re-formation may participate in the iron process.

Sulfur: Gun Barrel Separator analysis indicates very little sulfur. and sulfate values in the pilot test date indicate scavenger additives used to control chlorine. Hydrogen sulfide is addressed in the inorganic gases.

Sludge/Waste oil scum: The proposed solution does not have a dewatering technology due to the relatively low levels of solids and oil scum expected based on the analysis and testing performed. Solids will be collected in the sump of the clarifier and periodically removed via truck pump extraction for off-site disposal. Collected oils will also be extracted via truck removal on an as need basis.

The unit operations used in the water treatment process are divided into a pretreatment system located in containers outdoors and a desalination system located within a treatment building. The pretreatment system is comprised of four physical operations plus a fifth desalination operation. There are also two physical side stream operations attached to the pretreatment systems and not in the direct flow path. All produced water reports to the DSU through an influent flow meter. The DSU is configured as a single train operation capable of treatment from 1 to 12,000 bpd so it can pace downstream operations. Produced water is incrementally treated as it passes through a series of six DSU stages where hydrocarbons are removed. Carbon dioxide is coincidentally removed through this process. To maximize carbon dioxide removal the degassing sump is sized to allow inter stage equilibration of the inorganic carbon species. A small amount of ozone is injected into the DSU to support the separation of oil from colloidal material. Hydrocarbons that can be gaseous at operating temperatures are partitioned to the o0-gas and drawn to a regenerative thermal oxidizer for destruction. Remaining hydrocarbons produce a residue layer which is periodically drained to the slop tank for disposal. The hydrocarbon clean water at the discharge of the DSU is pumped to a two train LRS separator. Each LRS train is fed by his own pump. An air gap in the LRS fill manifold is used to eliminate the check valves. Any remaining liquids or solids from the DSU treatment that can be floated or settled are removed. The clarified e0luent from each train flows by gravity to a complementary noncontact UV system. The noncontact UV system is passive and provides antimicrobial conditioning. Irradiated water drains from UV system to a filter feed surge tank below. To prevent inoculation of the clarified bacteria free water, EDR electrode water containing up to 7.5 ppm free chlorine is continuously added to the filter feed tank to provide a residual.

Treatment of the produced water takes place in three functional groups. Incoming produced water reports to the DSU and contains fuel gas. The DSU and RTO which cleans off-gas from the DSU form the TPH group and are physically located in a separate area with hazardous classification. The LRS, UV Irradiation and filter form the second group whose function is to protect the desalination membranes. All equipment that is within the treatment building forms the DESAL group.

Safety of Operations: The risk controls typically integrated with the process design are described below.

Safe Path Philosophy: Where possible, the ultimate goal of the safe path philosophy is to have the treatment works appear transparent to upstream and downstream controls. A safe path philosophy for water treatment works incorporates several principles:

Cascade dependent path should Fail Operational
Minimize or eliminate safety cut paths or fault tree connections between processing unit and cascade flow dependent systems. (no cascading failures between systems)
Passively safe design, minimize safety-critical systems.
Environmental safety interval is greater than manual control response time.
Consequence reduction review for energy limits and leak path direction.
Safety devices must decrease consequence.
Process upsets may not trigger emergencies.
Minimal number of risk paths Fail Operational: Water treatment systems like the produced water pretreatment works are cascade dependent systems. That is, the operation of the production unit is in a real physical sense, dependent on downstream systems accepting bulk material for safe operation. The safe path design separates bulk material flow control from the process performance control. Safe path goals for the cascade dependence:

Inherently Safe Design. No active controls are used within the treatment process to respond to a change in treatment flow of the gas or liquid.
100% of design water flow can safely pass through the treatment system with any combination of treatment equipment operating, regardless of gas flow.
100% of the design gas flow can safely pass through the treatment system at any water flow, up to the hydraulic capacity, with any combination of treatment equipment operating.

This characteristic of appearing as a baffled tank produces an inherent Fail Operational response. True Fail Operational response is needed to prevent faults in the treatment works from extending upstream to the production unit.

Safe Path Design DSU—Hazardous Area Passive Stability: The second component of the safe path philosophy is the passive stability of the bulk material flow and to the greatest extent possible, the process performance. Passive stability refers to the inherent stability due to design rather than active control. Capacity of the pretreatment works must easily pace downstream treatment operations. The goal of the safe path philosophy is to make water treatment systems passively stable throughout all operational states in the downstream production unit as well as within the treatment works themselves. Rather than the addition of equalization tanks (volume scheme) to produce stability a friction scheme with three components was devised. Discrete individual stripping stages are connected in series incrementally reducing variations in flow and water quality. Hydraulically coordinated friction devices within each stage balance the stripper recirculation pump energy with the bulk flow, automatically compensating for the number of stripper pumps operating. Frictional components are to produce a stabilizing process e0ect from each loss where possible. Passive process stability was achieved by inter-stage ba0les (momentum and orifice) for dilution controls and by placing the inter-stage friction devices to produce complete mixing at the exit of each stage. For clarity, the typical inter-stage orifice is 10 inches X 6inches and not susceptible to plugging.

Turning now to the drawings and to FIGS. 1 and 2 in particular, shown therein are graphical representations of a water treatment system, designated by reference numeral 10, with characteristics and unit details as described herein. The system 10 generally comprises five unit operations: a phase separation unit 12, a clarifier unit 14, an irradiation unit 16, a filter unit 18, and an application specific treatment system 20. The water treatment system 10 is supplied influent water 22 from the producing environment. The influent water 22 generally is supplied from a gun barrel separator or other similar source. The influent water 22 is first fed to the phase separation unit 12, or desolventing unit (DSU). In addition to the influent water 22, the DSU 12 also is fed control gas, typically fresh air 24 and ozone 26 as inputs. The DSU 12 produces residuals, primarily oil and grease 28 that may be directed to a slop tank 30 and exhaust air that is passed to a regenerative thermal oxidizer (RTO) 32 for destruction. Treated fluid 34 from the DSU 12 is fed to the clarifier unit 14, also known as a Low Reynolds Separator, which may comprise a flocculator 36 and a clarifier 38. The clarifier unit 14 may produce oil and grease 28 that is directed to the slop tank 30 and sludge 40 that is passed to a thickener system 42. Sludge may be processed in a filter press 44 or the like before transported 46 away to an appropriate disposal site. From the clarifier 14, treated fluid 48 is directed to the irradiation system 16, preferably for ultra-violet irradiation. Irradiated fluid 50 is next sent to the filter unit 18. The filter unit 18 produces sludge 40 that is passed to the thickener 42. Treated water 52 from the filter unit 18 is finally fed to the application specific treatment system 20 for processing. The application specific treatment system 20 may be an electro-desalination reversal (EDR) system, fracking reuse and prep system, or other wastewater recovery system.

With reference now to FIG. 3, the DSU 12 is shown for discussion in greater detail. The DSU 12 is a multiphase hydrocarbon removal system and will remove both dissolved and free product hydrocarbons through a series of stages employing five treatment operations: Degassing, Air Stripping, Evaporation, Sublimation, Flotation, and Continuous Cavitation (colloid and emulsion breaking). The DSU 12 is designed to reduce totally dissolved solids by aerating water to alter and remove low chemically bonded inorganic minerals and metals, remove organic hydrocarbons, volatile organic compounds and attack biological organics. The DSU 12 uses the process of bringing in contaminated water (the source water) such as oil and gas produced water, mining waste water, industrial process water, etc., through specifically designed flow patterns within the unit to allow the source water to pass through air and generated ozone (Control gas), which reacts with the water to alter the chemistry of unwanted material, such as iron, bicarbonate, BTEX, DRO, GRO, paraffin, bacteria, etc. The reaction is amplified by the flow path as it forces the water to cavitate, break colloids, and boil/evaporate non-aqueous hydrocarbons and compounds. The unwanted materials are then either removed within the unit, by dissolved air flotation of light solids, or passed on to further specifically designed separators and filters to complete the process. Additional chemical reactions can take place within the unit, included but not limited to oxidation of metals, decarbonation by converting inorganic carbon to $CO_2$, and breaking oil water emulsions.

The DSU 12 is operated as a single train comprised of multiple stages with the fluid repeatedly circulated through the plurality of stages. Preferably there are six stages 56a-f connected in series, though the number of stages may be varied depending on work site and influent water characteristics. Each stage is identical in physical configuration and performing similar in operation, with different effects resulting from water quality changes as the fluid circulates through the DSU. The DSU 12 comprises an influent water inlet 60 and a treated fluid outlet 62. The DSU 12 further comprises a gas inlet 64 and a spent gas outlet 66. The gas inlet 64 allows for injection of control gas as required. The spent gas outlet 66, where DSU emissions, including but not limited to volatile organics, $CO_2$, and unreacted control gases, are captured from the DSU, may be connected to the RTO 32 (shown in FIGS. 1 and 2) for thermal destruction or combustion of the unwanted gases. Each stage 56a-f of the DSU 12 comprises a fluid inlet and fluid outlet, a recirculating pump 70, a hydraulic venturi system 72, a degassing sump and safe path 74, and a gas circulation duct 76, and a gas inlet and gas outlet. As the multiple stages of the DSU 12 are connected in series, the influent water inlet 60 is connected to the fluid inlet of the first stage 56a, the fluid outlet of the first stage is connected to the fluid inlet of the second stage, the fluid outlet of the second stage is connected to the fluid inlet of the third stage, and so on to have the multiple stages of the DSU in fluid connection, resulting in the fluid outlet 58 of the final stage 56f connected to the treated fluid outlet 62. Likewise, and in support of the counter flow for gas within the DSU 12, the gas inlet 64 is connected to the gas inlet of the final stage 56f, the gas outlet of the final stage is connected to the gas inlet of the previous stage 56e, and so on to have the multiple stages of the DSU in gas communication (in counter flow to the fluid flow), resulting in the gas outlet of the first stage 5a connected to the spent gas outlet 66 of the DSU.

In operation, the first stage 56a of the DSU 12 primarily equilibrates the produced influent water 22 to local atmospheric pressure, degassing fuel gas and inorganic acid gases in the hydraulic venturi system 72. An area within the degassing sump 74 of the first DSU stage 56a evaporates hydrocarbons that exhibit vapor pressure at the operating temperature. Within each stage 56a-f of the DSU 12, control gas and partitioned gases flow counter current to the produced water. Moving through remaining stages of the DSU 12, as the petroleum fraction of the air decreases, air stripping driving force in the hydraulic venturi 72 will increase. Subsequent stages will strip dissolved hydrocarbons while evaporating free product hydrocarbons and subliming of petroleum semi-solids. Also, in the remaining stages, TIC will be reduced through decarbonation. The stripping operation within the hydraulic venturi 72 will remove a portion of the carbon dioxide in each stage, converting carbonic acid and raising the pH. During residence in the degassing sump 74 of the DSU stage, the TIC species will rebalance to a new pH converting bicarbonate to both carbonate and carbon dioxide. The fresh carbon dioxide will again strip in the next "downstream" stage. The residence time in the degassing sump optimizes this decarbonation. The high compression hydraulic venturi Maxi-Strip 72 produces a type of DAF effect within the degassing sumps 74 of each stage. This allows those hydrocarbons not partitioned to the gas phase to collect in a residue layer which is periodically drained to a slop tank 30. Hydrocarbons partitioned to the gas phase are drawn to the regenerative thermal oxidizer for destruction. Deposition of petroleum solids, in particular paraffins, are expected within the DSU 12.

Turning to FIG. 4, a representative stage 56 of the DSU 12 is shown in greater detail. The DSU stage 56 comprises the fluid inlet 54 connected to the recirculation pump 70. The recirculation pump 70 moves fluid 78 from the stage fluid inlet 54 to a plurality of hydraulic venturi feeds 80 and 82. Preferably, the plurality of hydraulic venturi feeds 80 and 82 comprise a first feed 80 and a second feed 82. The first feed 80 and the second feed 82 are in fluid communication separately with an upper portion 84 of the hydraulic venturi 72. The separate feeds 80 and 82 function to circulate fluid to the hydraulic venturi 72 aspirating control gas 24 and 26 in a mixing fashion. Combined fluid 86 passes by gravity and pressure through a lower outlet 88 portion of the hydraulic venturi 72 into the degassing sump 74.

The degassing sump 74 comprises a sump tank 90, a flow pipe 92, and a degassing baffle 94. The sump 90 preferably comprises a tank having a top 96, a bottom 98, a first side 100 proximate the recirculating pump 70, and a second side 102 remote from the recirculating pump. The flow pipe 92 is disposed proximate the bottom 98 of the sump tank 90 and comprises an inlet 104 and an outlet 106. The inlet 104 of the flow pipe 94 is preferably located proximate the second edge 102 of the sump tank 90. The outlet 106 of the flow pipe 92, located proximate the first edge 100 of the sump tank 90, comprises the stage treated fluid discharge. The degassing baffle 94 is preferably connected to the inlet 104 of the flow pipe 94. The degassing baffle 94 may be formed as a flange on the inlet 104 of the flow pipe 92. The baffle 94 more preferably forms an acute angle with the flow pipe 92 as the baffle extends from the flow pipe.

The degassing sump 74 may also comprise a deflagration panel 108 at the top of the sump tank 90, at least one foam suppression nozzle 110 at the top of the sump tank, and a skimmer 112 on the second edge of the sump tank. The skimmer 112 may operate to collect floating solids, mainly organic hydrocarbons, that are recovered to be sold or disposed of. Operation of the foam suppression nozzle 110 breaks foam generated by the aggressive mixing of the control gases and the water 86 as they impact the surface of the water in the degassing sump 74.

The gas circulation duct 76 comprises a duct operatively connected between the degassing sump 74 and the hydraulic venturi 72. A first end 114 of the gas duct 76 is preferably connected to the top 96 of the degassing sump 74 proximate the second edge 102 of the degassing sump. A gas inlet 115 for the stage 56 is also disposed at the first end 114 of the gas duct 76. The gas inlet 115 allows for injection of control gas (for the final stage 56f) or useful exhaust gases (for stages 56a-e) and to equilibrate gas flow between the gas flow rate of the hydraulic venturi 72 and the rate gas leaves the system 64. A second end 116 of the gas duct 76 is operatively connected to the upper portion 84 of the hydraulic venturi 72. Preferably, a gas plenum 118 may be secured to the upper portion 84 of the hydraulic venturi 72 to provide for a connection interface for the second end 116 of the gas duct 76. More preferably, a deflagration joint is used to connect the first end 114 of the gas duct 76 to the degassing sump 74 and another deflagration joint is used to connect the second end 116 of the gas duct 76 to the gas plenum 118 at the hydraulic venturi 72.

The DSU stage 56 further comprises a liquid safe path tank 120 disposed between the fluid recirculation inlet 54 of the DSU stage 56 and the outlet 106 of the flow pipe 92. The outlet 106 of the flow pipe 92 is connected to a bottom of the first side 124 of the tank 120. The fluid recirculation inlet 54 of the DSU stage 56 is connected to a bottom of the second side 122 of the tank 120. The safe path tank 120 comprises a baffle system 126 that directs fluid (as shown by arrows) from the outlet 106 of the flow pipe 92 into a bottom of the safe path tank. The baffle 126 allows fluid to circulate intra-stage where some fluid flows to the fluid recirculation inlet 54 and then to the recirculation pump 70. The baffle 126 also allows fluid to circulate inter-stage where some fluid enters the stage through a safe path connector 128 that is provided for fluid communication between stages (as shown and discussed in FIG. 5A below). One skilled in the art will understand that safe path tank 120 comprises an outlet safe path connector (not shown) preferably on a side of the tank opposite from the inlet safe path connector 128. The safe path tank 120 thus provides the location for fluid connections between adjacent DSU stages 56.

The unique DSU stage 56 construction provides efficient liquid paths and gas paths during treatment of the influent water as the influent water passes through the various stages of the DSU 12. As shown by flow arrows, fluid enters the stage 56 at the stage inlet and to the fluid inlet 54. The recirculating pump 70 moves fluid to hydraulic venturi feeds 80 and 82. In the hydraulic venturi 72, fluid from the feeds 80 and 82 and gases from the gas plenum 118 combine effect flash degassing of liquid. Gravity and pressures on the fluids and gases generate a hydraulically created venturi shape in the venturi unit 72, causing a mass transfer and forcing the fluid and gas at a high rate into the degassing sump 74. As fluids impact fluid in the sump tank 74, this causes some amount of residue evaporation. Residue gathered on the surface of fluid in the sump tank 74 may be skimmed from the tank by the skimmer 112. Fluids gathered in the sump tank 74 circulate, resulting in Stokes degassing and causing dissolved air floatation. Fluids circulate around the baffle 94 and into the flow pipe 92. Gases in the degassing sump 74 move to the first end 114 of the gas duct 76, where control gases may also be blended into the system 10 for flow to the gas plenum 118 on the hydraulic venturi 72.

Referring now to FIGS. 5A and 5B, the flow of the liquids and gases through the DSU 12 is illustrated. FIG. 5A illustrates liquid flow safe path, in a plan view at a dilution control orifice elevation, proximate a bottom portion of the DSU 12. Fluid enters the DSU at the influent water inlet 60 into the first stage 56a at safe path connector 128a in safe path tank 120a. Fluid circulates within the stage from the outlet 106a of the flow pipe 92, mixes in the safe path tank 120a, and then enters the recirculation fluid inlet 54a into recirculating pump 70. As indicated above, the discharge from the fluid outlet 106a of the flow pipe 92 in any given stage is also connected from the safe path connector 128b to the stage inlet and thus the fluid inlet 54b of the next "downstream" stage. Thus, fluid circulates within each stage and is moved through the stage connector 128 to the next stage. In the final stage 56f, fluid is circulated as in other stages and treated fluid exits the DSU 12 through the safe path outlet 58 to the treated fluid outlet 62.

FIG. 5B illustrates the gas flow safe path in the DSU 12, in a plan view at a gas scoop elevation, proximate an upper portion of the DSU. Illustrating the counter flow of gases versus fluids, control gases such as fresh air and ozone, are introduced to the DSU 12 in the final stage 56f through the gas inlet 64. Gases flow through the gas duct 76 to the hydraulic venturi 72. Gas extracted from the treated water in the degassing sump 74 are connected to the gas inlet 115 of the preceding stage and mixed for circulation in the gas duct 76. Spent gases from the first stage 56a of the DSU 12 are passed through the spent gas outlet 66 to the RTO 32 (shown in FIGS. 1 and 2). Spent gas volume through the gas flow safe path may be coordinated with the RTO 32 to ensure combustible mixture to avoid supplemental fuel in the RTO 32.

The DSU treats produced water where phase behavior of each constituent is controlled. Each constituent is converted to a stable phase through evaporation, sublimation, mass transfer, partitioning, deposition and or precipitation. All the constituents of each phase once collected have a single removal point. The DSU multistage system incorporates a series of intra-stage partial capacity unit operations repeated in each subsequent stage. Maintaining phase behavior is controlled by removing petroleum compounds in a sequence of highest solvent to solute. Continuous cavitation is used to produce flash degassing in the first stage and to break colloids in subsequent stages. The DSU accomplishes air stripping of VOCs, evaporation of non-aqueous phase petroleum compounds, dissolving or induced air floatation of NAPL and light solids, and degassing of inorganic acid gasses. The DSU also maximizes $CO_2$ conversion through a staged de-carbonation. Specific intra-stage hydraulic retention time is controlled for inorganic carbon dissolved specie equilibration. Stage design increases pH; enhances carbonate precipitation and froth stabilization (aid oil separation). This design will maximize hydrocarbons converted and or collected in gas phase. TPH rich gas can be economically destroyed in the regenerative thermal oxidizer without supplemental fuel by coordination of the number of DSU stages online and controlling the spent gas volume rate at the RTO. Additionally there are no fugitive emissions after DSU treatment.

With reference now to FIG. 6, the clarifier unit 14 is shown for further discussion. The clarifier unit 14, which may also be referred to herein as a Low Reynolds Separator, is designed specifically to further separate suspended solids from the water treated by the DSU 12 using a calculated flow regime with low shear to allow the physics of water velocity and the differences of practical density to separate and drop out. The process allows the denser solids to be collected and disposed, and the lighter solids can be skimmed and disposed. The lower buoyant force aids separation targeting short chain paraffins and biological detritus. The innovative clarifier unit 14 employs uniquely designed plates allowing collected debris, as it builds in size, to not be dragged back up the plate and preventing fouling the inclined plate separation process. The design helps compensate for detrimental temperature effects on inclined plate clarifiers. The unique inclined plates will float LNAPL and semi-solids, sink DNAPL and solids, and settle inorganic solids. Additionally, the design encourages petroleum solids depositional growth by promoting low shear upwell mixing and increasing hydraulic retention time.

As illustrated in FIG. 6, the clarifier unit 14 comprises an inlet port 600, the flocculator 38, a flow tank 602, the clarifier 38, and a discharge port 604. The inlet port 600 is in fluid communication with the treated fluid outlet 62 of the DSU 12. Fluid from the inlet port 602 is directed to the flocculator 36, which functions as a recirculation and flow control module. The flocculator 36 comprises a tank 606, a tank inlet 608, a plurality of circulating paddles 610, and a tank discharge 612. The tank inlet 608 receives fluid from the inlet port 600 and is located at a base of the tank 606. The plurality of circulating paddles 610 are disposed within the tank 606 and operatively disposed to rotate, circulating the fluid in the tank. Preferably, the circulating paddles will function to circulate fluids in the tank at a rate approximately 20-26 times the influent flow rate. Turbulent flow in the recirculation module will result in a Reynolds number on the order of 10000-15000, creating low shear deposition and crystal growth. Liquids in the flocculator 36 will flow from the tank discharge 612 proximate a top of the tank 606.

Flow from the tank discharge 612 of the flocculator 36 will flow in a path down to an inlet 614 of the flow tank 602. The flow tank 602 serves as an intermediate collection zone for liquids where the Reynolds number of the liquids will preferably average less than 8000, resulting in paraffin crystal ripening. Liquids pass from the flow tank 602 through a discharge port 616 proximate a top of the flow tank 602 and through a path to the clarifier 38. The clarifier 38 is preferably an inclined plate clarifier comprising a plate system 620. The plate system 620 comprises a plurality of inclined plates 622 arranged in parallel fashion. Each plate 622 comprises a flat surface 624 and an opposite scalloped profile surface 626. The arrangement of the plates 622 defines a fluid path from the flow tank 602 across and through the plates to a clarified well 630. The flow across the plates 622 allows DNAPL to sink and be collected in a solids storage basin 632 and allows LNAPL to float and be collected in a paraffin collector 634. A hydraulic rake 636 used in the solids storage basin 632 permits solids to be removed from the clarifier through an underflow pump 638. The solids in the paraffin collector 634 may be removed by skimmer 640 to the slop discharge 30.

Turning to FIGS. 6A and 6B, detail of the plate 622 surfaces and fluid flow is shown. The insert of FIG. 6A shows the plates 622 defining the liquid flow path between the flat surface 624 of one plate and the profile surface 626 of an adjacent plate. Fluid flow is along the direction of arrows. The design of the plates 622 results in average Reynolds number of less than 300 in the flow across the plates, with no pole switching of vorticity during flow. Paraffins and LNAPL are separated and collect along the profile surface 626 of the plates 622, while solids and DNAPL are separated and collect along the flat surface 624 of the plates. FIG. 6B illustrates the surface detail of adjacent plates 622 in magnified detail, showing the flat surface 624 opposite the profile surface 626 of each plate. The scalloped profile surface 626 of the plates 622 promotes a local Reynolds number of less than 250 with no disconnected vorticity and resulting in drag induced crystal growth.

The clarifier unit, or LRS, lowers buoyant force requirement in Stokes based separation targeting short chain paraffins and biological detritus. The design compensates for detrimental temperature effects on inclined plate clarifiers. The LRS floats LNAPL and semi-solids, sinks DNAPL and solids, settles inorganic solids, and encourages petroleum solids depositional growth with low shear upwell mixing and high hydraulic retention time that yields complete (time) phase stabilization and ripens petroleum solids crystal structure and size.

Referring now to FIGS. 7A and 7B, there is shown therein a preferred embodiment of the ultraviolet irradiation unit 16 for the water treatment system 10. UV irradiation is a well accepted form of disinfection for clear water the ability to disinfect without chemicals is advantageous. The present uniquely designed irradiation unit is a non-contact multi-stage system incorporating a series of intra-stage partial capacity unit operations repeated in each subsequent stage. Note: The partial capacity of each physical stage varies by flow rate and degree of radiation required for specific types of biology. Typically, two stages are used for microbial control. Partial capacity stages are easy to configure as the dosage rate contains a time component and the effective dose is a simple sum of all the single stage dosages. The system of FIG. 7 provides for microbial control of bleaching and inactivation, coincidental ozone production, ozone and "chlorine" quench, particle surface modification, partial destruction of organic compounds, and uses UV-C at a 150-350 nm wavelength with peak distribution around 254 nm. The present design overcomes challenges of non-contact UV irradiation where flowing water reflects from 30% to 70% of incoming light, and after the light has penetrated the surface, the in-ability to consistently create a sufficient dosage. The dosage limits are either due to depth of water and its limitations to UV transmittance (UVT) or the ability to cover sufficient surface area on shallow flow systems.

Continuing in reference to FIG. 7A, the irradiation unit 16 is shown in operational mode and comprises a fluid inlet 700, a treated fluid outlet 702, an irradiation chamber 704, and at least one irradiation stage 706. The fluid inlet 700 is operatively connected to the fluid discharge outlet of the clarifier unit. The treated fluid outlet 702 passes treated fluid from the irradiation unit 16 to the filter unit 18 of the treatment system 10. The irradiation chamber 704 provides a basin for the flowing liquids to be irradiated by the at least one irradiation stage 706.

Turning now to FIG. 7B, the irradiation unit 16 is shown in an open position allowing access to the components of the unit. This UV device 16 is specifically designed to effectively treat water to destroy any remaining organics or ozone left in the water after passing through the DSU 12 and clarifier unit 14. As shown, the irradiation chamber 704 comprises an influent stillwell 708, an irradiation bed 710, a broad crest distributor 712, and a discharge launder 714. The influent stillwell 708 provides a basin for influent liquids from the fluid inlet 700. Fluids then flow to and through the irradiation bed 710 which is positioned below the at least one irradiation stage 706 so that flowing fluids can be exposed to UV irradiation. The irradiation bed 710 is a uniform and flat surface adjacent the influent stillwell 708 basin. The unit 16 conditions the water to remain perfectly flat, eliminating the reflective surface, increasing the effectiveness of each UV wave created by the unit. The irradiation unit 16 is preferably further designed with a highly reflective and satin smooth surface using titanium oxide, anatase crystalline form welded to stainless steel that eliminates the buildup of material in the boundary layer of the water flow, and a layer of concentrated UV waves to enhance effectiveness. Fluid flow through the irradiation bed 710 concludes across the broad crest distributor 712 for flow rate control. The broad crest distributor 712 represents a convex surface raised within the irradiation chamber 704 to limit fluid flow. After passing across the broad crest distributor 712 fluid flow is passed to the discharge launder 714, a fluid basin adjacent the fluid outlet 702.

Also shown in FIG. 7B, the at least one irradiation stage 706 preferably comprises two irradiation stages 720 and 722. The irradiation stages 720 and 722 are adjacent and in series, so that fluid flow passes beneath both stages. The irradiation stages 720 and 722 comprise a plurality of collimators 724. The plurality of collimators 724 function to focus the UV light into the irradiation bed 704 as fluid flows through the irradiation bed. The unit 16 is engineered to effectively allow the UV light generated by the collimators 724 to contact all parts of the water without the water coming into contact with the UV light source or material protecting the light source.

Referring to FIG. 8, shown therein is a representative collimator 724. The collimator 724 comprises a reflective dome 726 and a UV light source 728. The reflective dome 726 comprises a parabolic reflector 730 that focuses the UV waves 732 that are emitted from the UV light source 728 in all directions, and directly perpendicular to the liquid's surface 734. The UV light source 728 preferably comprises an amalgam bulb in a quartz sheath or the like. The UV light source 728 produces UV waves that are reflected off the parabolic reflector 730 of the reflective dome 726 at various angles in order to contact the flowing liquid perpendicular to the liquid surface 734. The UV light source 728 and reflective dome 726 function to increase the penetration concentration of the UV light source in the liquid.

In operation, the irradiation unit 16 design employs principles of fluid flow to create a water surface flat enough to produce a maximum of 30% scatter of non-collimated light on its first reflection and shallow enough to work with 67% UBT. The UV light source 728 with a geometric structural configuration where the physical dimensions of the parabolic reflector 732 coordinate with the size of the UV light source located at its focal point in order to produce a minimum of 57% collimated light that can penetrate the water surface. The irradiation unit provides microbial control through bleaching and inactivation. Additionally resulting in coincidental ozone production, an ozone and "chlorine" quench, particle surface modification, and partial destruction of organic compounds.

After fluid passes through the irradiation unit 16, fluid from the fluid outlet 702 is directed to the filter unit 18. Preferably the filter unit comprises device that stops the progression of suspended solids in the water. The filter 18 would limit the size of particle down to the smallest size as designed specifically for the application. i.e. no filter is capable of stopping all suspended solids. The filter unit 18 of the present water treatment system 10 may be any filtration media such as cloth, ceramic or other type membrane, etc.

Various modifications can be made in the design and production of the present invention without departing from the spirit thereof. Thus, while the principal preferred construction and use of the invention have been explained in what is now considered to represent its best embodiments, it should be understood that the invention may be practiced otherwise than as specifically illustrated and described, and claimed in the following claims.

What is claimed is:

1. A method for treating water, the method comprising:
supplying influent water to a multiple stage processing unit;
processing the water in each stage of the multiple stage processing unit by performing each of the steps of:
degassing the water by saturating the water with air;
stripping volatile compounds from the water;
evaporating non-aqueous phase liquid petroleum from the water;
decarbonating the water;
subliming semi-solids from the water;
resolving emulsions in the water; and
breaking colloids in the water using continuous cavitation; and
depositing and ripening petroleum solids;
wherein each stage of the processing unit is connected in series to an adjacent stage; and
wherein a portion of the water from a given stage is circulated to a fluid inlet of a subsequent stage; and
wherein gas emissions from a given stage are circulated to a gas inlet of a preceding of stage;
clarifying the water discharged from the multiple stage processing unit through floatation and sedimentation;
inactivating volatile microbes in the water discharged from the processing unit;
filtering the water discharged from the processing unit; and
combusting gaseous emissions.

2. The method of claim 1 wherein the multiple stage processing unit comprises a series of six stages; and
wherein the influent water is supplied to an inlet of a first stage of the series of stages; and
wherein a portion of the water from the first stage is circulated to an inlet of a second stage; and
wherein a portion of the water from a final sixth stage of the series of stages is circulated to a clarifier for the clarifying step;
wherein control gas is supplied to the final sixth stage; and
wherein air emissions from the sixth stage are circulated to a fifth stage of the series of stages; and
wherein gas emissions from the first stage are circulated to a unit for step of combusting gaseous emissions.

3. The method of claim 1 further comprising the steps of:
injecting ozone into the multiple stage processing system; and
skimming a residue from the water in the first stage of the processing system.

4. The method of claim 1 wherein the filtering step comprises filtering water using a plurality of ceramic filters.

5. The method of claim 1 wherein the degassing step comprises passing the water across a deflector in a venturi system and circulating the water in a degassing sump.

6. The method of claim 1 wherein the stripping step comprises passing the water through a stripper having a venturi system.

7. The method of claim 1 wherein the stripping step comprises passing the water through a venturi system and into a sump; and
wherein the degassing step comprises circulating the water in the sump; and
wherein the evaporating step comprises forcing the water from the venturi system through a residual layer in the sump at high pressure.

8. A method for treating an influent water in each stage of a multiple stage processing unit, the method comprising:
degassing the water by saturating the water with air;
stripping volatile compounds from the water;
evaporating non-aqueous phase liquid petroleum from the water;
decarbonating the water, and killing or inactivating volatile microbes in the water.

9. The method of claim 8 where the step of decarbonating the water comprises repetitively stripping and equilibrating the total inorganic carbon specie in the water.

10. The method of claim 8 further comprising:
clarifying the water through floatation and sedimentation; and
filtering the water.

11. The method of claim 8 further comprising:
subliming semi-solids from the water; and
breaking the colloids in the water using continuous cavitation.

12. The method of claim 8 further comprising the step of combusting gaseous emissions.

13. A system for treating produced water, the system comprising:
a multiple stage processing unit, wherein each stage comprises:
a fluid mobilization unit comprising:
a fluid chamber having at least one partition;
a fluid inlet attached to the chamber;
a pump; and
a fluid outlet; and
a fluid processing component comprising:
a degassing sump, the sump having a water outlet;
a stripper positioned above the sump, the stripper having at least one water inlet operatively connected to the fluid outlet;
an air inlet adjacent the stripper;
a gas exhaust adapted to circulate gases from the sump to the stripper;
wherein the pump operates to move fluid from the fluid chamber to the water inlet of the processing component; and
a regenerative thermal oxidizer;
a clarifier unit;
an ultraviolet irradiation unit; and
a filtration unit;
wherein exhaust gases from a first stage of the processing unit are circulated to the thermal oxidizer; and
wherein influent water is adapted to be supplied to the fluid inlet of the first stage; and
wherein fresh air is adapted to be supplied to the air inlet of a final sixth stage of the processing unit.

14. The system of claim 13 wherein the water outlet of the first stage is operatively connected to the fluid inlet of a second stage of the processing unit; and
fluid inlet of a second stage of the processing unit; and
wherein the gas exhaust of the final sixth stage is operatively connected to the air inlet of a fifth stage of the processing unit.

15. The system of claim 13 wherein the first stage of the processing unit further comprises a skimmer operatively connected to the sump.

16. The system of claim 13 wherein the sump comprises a fluid conduit disposed proximate a base of the sump; and
wherein the fluid conduit has a first end operatively connected to the water outlet of the sump and a second end disposed in fluid communication with fluid in the sump.

17. The system of claim 13 wherein the irradiation unit comprises a vent; and
wherein gases vented from the vent are circulated to the multiple-stage processing unit.

* * * * *